United States Patent [19]

Isakson

[11] Patent Number: 4,961,846
[45] Date of Patent: Oct. 9, 1990

[54] COLLAPSIBLE FILTER FOR A FLUID POWER APPARATUS

[75] Inventor: Larry E. Isakson, Mishawaka, Ind.

[73] Assignee: Allied-Signal Inc., Morristown, N.J.

[21] Appl. No.: 369,387

[22] Filed: Jun. 21, 1989

[51] Int. Cl.$^5$ .................. B01D 27/10; F15B 21/04
[52] U.S. Cl. ............................ 210/131; 210/168;
210/416.5; 210/429; 210/437; 210/451;
210/495; 210/497.01; 60/454; 92/78
[58] Field of Search ............. 60/453, 454; 92/78;
210/131, 171, 416.5, 437–439, 497.01, 497.2,
495, 499, 168, 429–432, 441, 442, 451, 416.1

[56] References Cited

U.S. PATENT DOCUMENTS

| Re. 29,447 | 10/1977 | Farrow et al. | 210/232 |
|---|---|---|---|
| 82,255 | 9/1868 | Jansson. | |
| 1,741,672 | 12/1929 | Arnold | 210/438 |
| 1,917,203 | 7/1933 | Heinz. | |
| 2,071,742 | 2/1937 | Hancock | 303/1 |
| 2,274,352 | 2/1942 | Wood | 210/164 |
| 2,330,625 | 9/1943 | Reppmann | 210/177 |
| 2,517,704 | 8/1950 | Overbeke | 210/169 |
| 2,545,769 | 3/1951 | De Haven | 210/170 |
| 2,661,847 | 2/1953 | Buettner | 210/166 |
| 2,667,125 | 1/1954 | Foss et al. | 103/42 |
| 3,967,536 | 7/1976 | Bach | 60/553 |
| 4,257,890 | 3/1981 | Hurner | 210/439 |
| 4,292,180 | 9/1981 | Zylka et al. | 210/496 |
| 4,679,397 | 7/1987 | Kosarski et al. | 60/563 |

Primary Examiner—W. Gary Jones
Assistant Examiner—Matthew O. Savage
Attorney, Agent, or Firm—Larry J. Palguta; Ken C. Decker

[57] ABSTRACT

A fluid power apparatus (10) includes a power piston (40) dividing a working chamber (18) from a first chamber (16), the power piston (40) biased toward a rest position by a spring (17) and the piston (40) displaced by means of restricting fluid flow between the working chamber (18) and first chamber (16). In order to keep contaminants from entering the first chamber (16), a collapsible filter (80) is disposed about a piston rod (13) of the power pistion (40), the filter (80) having at an end cap (88) with a central opening (91) through which extends the piston rod (13) and at an opposite end member (98) a flange (95) which serves as a seat (97) for the spring (17). The end member (98) seats sealingly against the power piston (40) while the end cap (88) has a sealing mechanism (92) about the periphery of the central opening (91) to provide sealing between the end cap (88) and input rod (13). If during operation of the fluid power apparatus (10) the end cap (88) should engage an opposite wall (15) of the first chamber (16), the filter (80) collapses and permits continued full stroke displacement of the power piston (40) without damage to the filter (80). Should the filter (80) become clogged, the spring (27) seated upon the flange (95) permits the flange (95) to lift away from the power piston (40) so that fluid may bypass the filter (80) and effect continued operation of the fluid power apparatus (10).

11 Claims, 2 Drawing Sheets

COLLAPSIBLE FILTER FOR A FLUID POWER APPARATUS

This invention relates generally to a fluid power apparatus having a collapsible filter, and in particular a hydraulic fluid power booster for operating a master cylinder.

Hydraulic fluid power boosters for the operation of master cylinders have been utilized for many years. In certain hydraulic fluid power boosters, the booster operates by restricting fluid flow from one side of a power piston to the other side of the power piston, thereby creating a fluid pressure differential which effects a displacement of the power piston and operative power assisted displacement of the pistons of the master cylinder. Prior fluid power boosters have included a fixed filter disposed about a rod on the power piston so that fluid passing through the power piston will be filtered when it enters into a first chamber of the apparatus. However, the fixed filter is non-collapsible and therefore cannot engage any walls of the first chamber of the apparatus without experiencing damage thereto. This also results in a shortened displacement stroke of the power piston, depending on the size of the housing of the apparatus. It is desirable to provide a filter for the flow of fluid through the power booster but which does not result in a shortened stroke of the power piston. Ideally, the filter would be engageable with an opposing wall of the first chamber such that it would not experience any damage and also permit a full displacement stroke of the power piston.

The present invention provides a solution to the above Problems by providing an unique collapsible filter for utilization with a hydraulic power booster. The present invention comprises an end cap spaced apart from an end member, the end cap and end member connected together by filter means which permits fluid to flow therethrough, the end cap including a perimeter to which is attached said filter means and an end surface which extends inwardly from the perimeter toward a longitudinal axis of said filter, the end surface having a central opening with a flexible sealing mechanism disposed about the central opening, the flexible sealing mechanism capable of engaging in a sealing manner a member extending through the central opening so that fluid will be directed for flow through said filter means, the end member including a perimeter to which is attached the filter means, and a flange, the flange including a surface disposed opposite from said filter means and for engaging a correspondingly shaped surface so that fluid is directed toward the filter means for flow therethrough, the end cap and end member movable toward one another so that the filter means collapses and permits a continued filtering of fluid therethrough despite said collapse.

One way of carrying out the invention is described in detail below with reference to the accompanying drawings which illustrate an embodiment thereof, in which.

Figure 1:
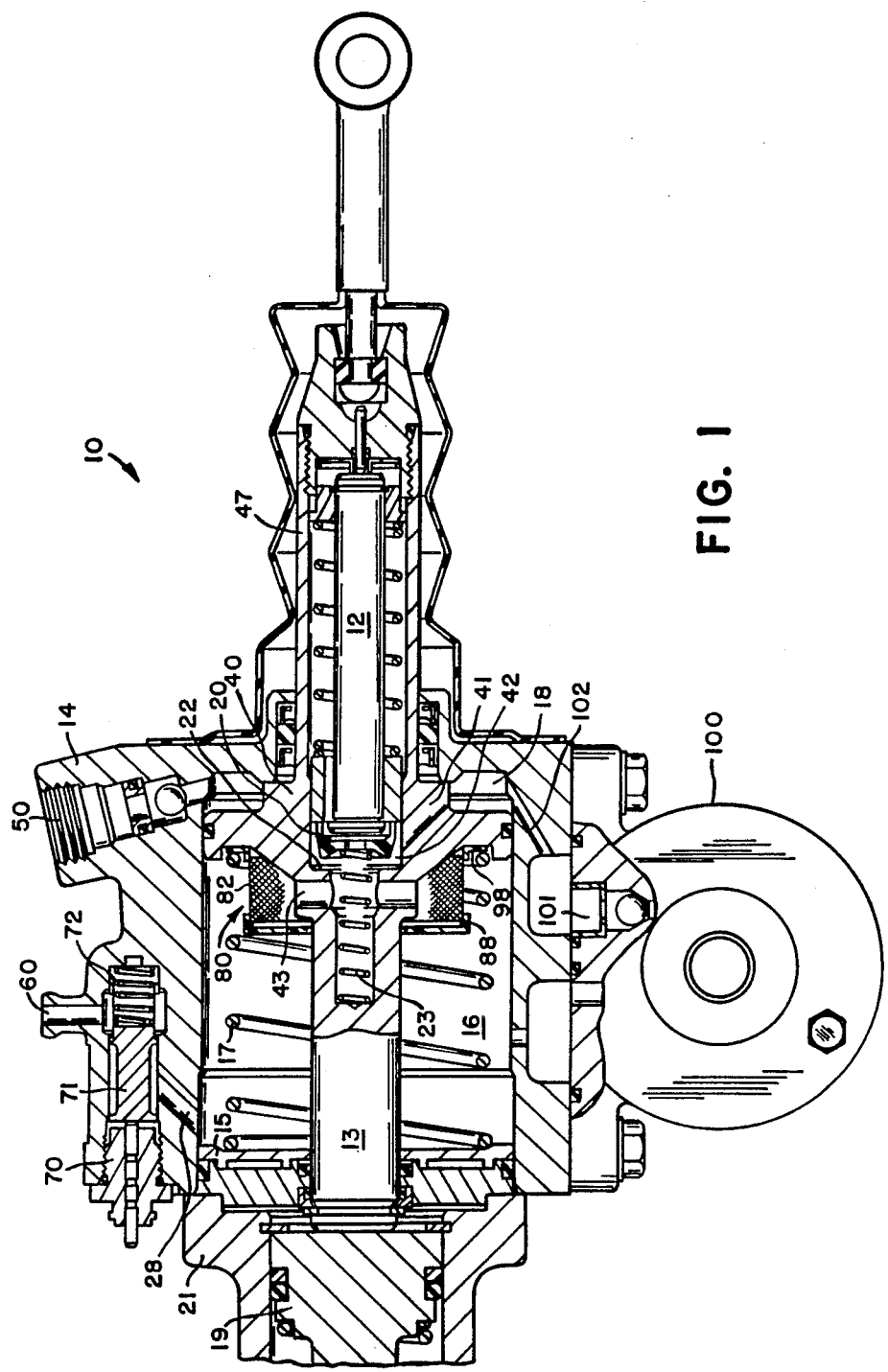
FIG. 1 is a section view of the fluid power apparatus and collapsible filter.

The fluid power apparatus 10 is illustrated in detail in FIG. 1. An input rod 12 interacts with the brake pedal of the vehicle, and has at one end thereof a valve seal 20 disposed adjacent valve seat 22 of piston 40. The fluid power apparatus housing 14 defines a chamber divided by piston 40 into a first chamber 16 and a working chamber 18. The piston 40 includes a spring 23 biasing the valve seal 20 against input rod 12. A return spring 17 engages at one end a wall 15 of chamber 16 and at the other end biases the piston 40. Apparatus 10 includes a fluid power inlet 50 and a fluid power outlet 60, the inlet 50 being connected with a power steering pump and receiving fluid pressure therefrom. The fluid power apparatus may receive fluid pressure either from a power steering apparatus or from a dedicated pump provided therefor. Piston 40 includes inlet passage 41 communicating with chamber 42 and an outlet 43 so that fluid pressure received through inlet 50 is communicated through passage 41, chamber 42, and outlet 43 to first chamber 16 which has at least one opening 28 communicating with the fluid power outlet 60. Fluid power outlet 60 includes flow switch 70 engaged by piston 71 biased toward switch 70 by spring 72. Attached to power apparatus 10 is an electric pump 100 which is operatively connected to the flow switch at 70. Input rod 2 is received within extension 47 of piston 40, and extension 47 is integral with piston rod 13 which engages a primary piston 19 of a master cylinder 21.

Figure 2B:
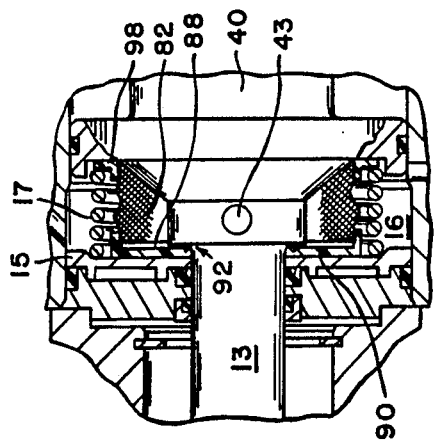
FIG. 2B is a section view of the filter in a collapsed state.
Figure 2A:
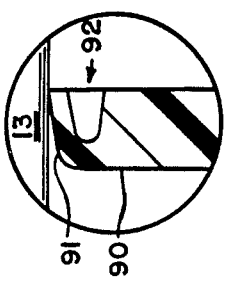
FIG. 2A is a partial section view of a seal of the collapsible filter.

Disposed about piston rod 13 is collapsible filter 80. Collapsible filter 80 comprises a filter material or mesh 82 which is generally annularly shaped and connects together an end cap 88 and an end member 98. End cap 88 includes a perimeter 89 to which is connected the filter material and an inwardly extending end surface 90 which defines a central opening 91 located about a longitudinal axis A of filter 80 and piston rod 13. Central opening 91 is generally annular shaped and includes a sealing mechanism 92 (see FIG. 2A). Sealing mechanism 92 comprises a lip seal which engages sealingly and slidingly the surface of piston rod 13 so that as end cap 88 moves along piston rod 13 a seal will be effected between end cap 88 and rod 3. End member 98 comprises a perimeter 94 which is generally annularly shaped and extends into a radial flange 95. Flange 95 includes a flat base 96 which seats against the Power piston 40 to effect a seal therebetween. The other side of flange 95 provides a spring seat 97 for spring 17 which biases the base 96 into engagement with power piston 40 and simultaneously biases power piston 40 toward an at-rest position within apparatus 10. The filter means or material 82 comprises a generally annular shaped material which may have overlapping ends, or may comprise a continuously annularly shaped filter mesh material.

Fluid power apparatus 10 receives, through inlet 50, fluid pressure from either a power steering apparatus or a dedicated pump. The fluid pressure is communicated through passage 41, chamber 42, outlet 43 and first chamber 16 to fluid power outlet 60 when the vehicle brakes are not being applied and apparatus 10 is in the inactive position illustrated in FIG. 1. As the vehicle operator steps on a brake pedal, the input rod 12 is displaced longitudinally toward the left in FIG. 1, causing valve seal 20 to approach valve seat 22 and restrict flow through the piston 40 to first chamber 16. The buildup of fluid pressure in working chamber 18 causes a pressure differential between the chambers, and biases piston 40 to the left against return spring 17. This provides a fluid Power boost to the displacement of input rod 12 by the vehicle oPerator, the fluid power boost assisting the vehicle operator in effecting operation of the master cylinder. It should be clearly understood that fluid Power apparatus 10 may comprise any of numerous designs which effect a fluid power boost for the master cylinder. Such fluid power apparatuses have been previously disclosed in U.S. Pat. No. 3,967,536 entitled: *Pneumatic and Hydraulic Power Brake Apparatus*" and U.S. Pat. No. 4,679,397 entitled: "*Hydraulic Power Brake Apparatus*", each assigned to the same assignee as the present invention and incorporated by reference herein. In each cited patent the fluid power apparatus provides a hydraulic power boost for actuation of the master cylinder. Fluid power apparatus 10 further includes electric pump 100 to provide the fluid pressure necessary for effecting operation of power apparatus 10 in case there is a failure of fluid pressure provided to inlet 50. If the fluid pressure to inlet 50 should fail, the fluid flow through outlet 60 would decrease accordingly and cause piston 71 to move and effect operation of flow switch 70 which causes electric pump 100 to operate. Electric pump 100 provides the necessary fluid pressure through inlet 101 and passage 102 to the working chamber 18.

Figure 2:
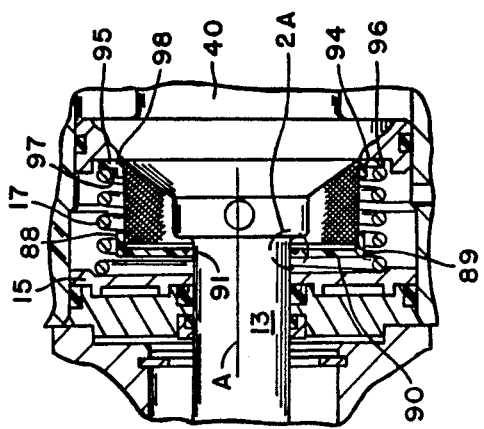
FIG. 2 is a section view of the collapsible filter of the present invention.

When fluid is being transmitted between inlet 50 and outlet 60, both during both the inactive and active operation modes of apparatus 10, the fluid passes through passage 41, chamber 42, outlet 43, and collapsible filter to the first chamber 16. Fluid contaminants exist within vehicle systems in which the illustrated fluid power apparatus is utilized. Such contaminants cause damage to electric pump 100 for the apparatus. In some cases, the damage may be sufficient to disable the backup system. Thus, the filter 80 provides the required filtering of fluid being transmitted through apparatus 10, while at the same time not requiring any reduction in the total stroke capability of the booster. When apparatus 10 is activated by displacement of input rod 12; power piston 40 is displaced by the fluid pressure differential thereacross and moves across first chamber 16 (see FIG. 2). In some cases, the end surface 90 may engage wall 15 of first chamber 16. When this happens, the end cap 88 is displaced axially toward piston 40 (see FIG. 2B) and sealing mechanism 92 slides along piston rod 13 to maintain a seal therebetween. The filter material 82 collapses so that filter 80 is not damaged by the engagement with end wall 15. The filter material 82 collapses easily because filter 80 does not include any axial ribs connecting together end caps and which may be found in other types of filters.

The end member 98 also serves as a dirt or contaminant seal so that such material does not pass into first chamber 16 but is captured within filter 80. Should filter 80 become, over an extended period of time, clogged with contaminant material, filter 80 in combination with apparatus 10 also provides an unique fluid bypass mechanism. Should filter 80 become clogged to the extent that a sufficient volume of fluid cannot be transmitted therethrough, end member 98 will be displaced, by fluid pressure, against spring 17 such that base 96 moves axially away from piston 40 and permits fluid to flow from outlet 43, around end member 98, and into first chamber 16. Even though the filter is clogged, the apparatus is not disabled because filter 80 provides a unique fluid bypass so that fluid can continue to be circulated between fluid power inlet 50 and fluid power outlet 60, both during the inactive and activated modes of operation. Thus, collapsible filter 80 of the present invention not only provides for the necessary filtering of continuous fluid flow between inlet 50 and outlet 60, but provides a collapsible filter that continues the necessary sealing engagement with piston rod 13 during the time the filter is collapsed, and provides a unique fluid bypass for fluid flow when the filter becomes clogged and a sufficient volume of fluid cannot pass through the filter material.

I claim:

1. An apparatus in combination with a collapsible filter, the apparatus comprising a fluid power apparatus having a housing, an input rod, a first chamber and a work chamber divided by a power piston, a spring biasing said power piston, a fluid power inlet communicating with said work chamber, a fluid power outlet communicating with said first chamber, passage means through said power piston, valve means connected to said input rod and controlling fluid flow through said passage means, the collapsible filter comprising an end cap and an end member connected together by collapsible filter means, the end cap including a part, at which the filter means is connected and the part extending inwardly to a central opening, the central opening including a sealing mechanism, the end member comprising a part connected with said filter means, and a flange, the collapsible filter disposed about a piston rod of said power piston so that said sealing mechanism engages sealingly the piston rod which extends through the central opening, the flange seating at the power piston such that the spring cooperates with said flange, displacement of the input rod effecting operatively a displacement of the power piston such that a full stroke displacement of the power piston includes the end cap engaging a portion of said first chamber and the collapsible filter means collapsing in order to permit the full stroke displacement.

2. The apparatus and collapsible filter in accordance with claim 1, wherein the collapsible filter means comprises a generally annular shaped filter material which connects together the end cap and end member.

3. The apparatus and collapsible filter in accordance with claim 2, wherein the filter means extends continuously in a circumferential direction.

4. The apparatus and collapsible filter in accordance with claim 1, wherein said spring permits said flange, should the filter means become clogged, to move away from the power piston and allow fluid flow around an exterior part of the flange.

5. The apparatus and collapsible filter in accordance with claim 4, wherein the movement of the flange away from the power piston comprises a bypass mechanism for fluid flow around said filter when the filter means becomes clogged.

6. A collapsible filter, comprising an end cap spaced apart from an end member, the end cap and end member connected together by flexible filter means which permits fluid to flow therethrough, the end cap comprising a radially outer, axially extending flange with said filter means connected to a radially inner surface thereof, and an end surface which extends inwardly from the flange toward a longitudinal axis of said filter, the end surface having a central opening and an integral flexible sealing mechanism disposed about the central opening, the flexible sealing mechanism capable of engaging in a sealing manner a member extending through the central opening so that fluid will be directed for flow through said filter means, the end member comprising a radially outer, axially extending part having an inner surface connected with the filer means, said end member having an outwardly extending radial flange including a first surface disposed opposite from said filter means and for engaging a corresponding shaped surface so that fluid is directed toward the filter means for flow therethrough, and a second surface opposite said first surface forming a spring seat for engaging a spring biasing said first surface against said corresponding shaped surface, the end cap and end member movable toward one another so that the flexible filter means collapses and permits a continued filtering of fluid therethrough despite said collapse.

7. The collapsible filter in accordance with claim 6, wherein the sealing mechanism comprises a lip seal.

8. The collapsible filter in accordance with claim 7, wherein the collapsible filter comprises a ribless filter wherein the filter means forms the only connection between the end cap and end member.

9. The collapsible filter in accordance with claim 6, wherein the end cap comprises a generally annular shaped cap.

10. The collapsible filter in accordance with claim 9, wherein the end member comprises a generally annular shaped end member.

11. The collapsible filter in accordance with claim 6, wherein the filter means comprises a generally annular shaped, continuously extending filter material.

* * * * *